June 12, 1956 R. S. TICE 2,749,715
DRINKING GLASS CHILLER

Filed June 23, 1955 2 Sheets-Sheet 2

INVENTOR.
REUBEN S. TICE
BY
Boyken, Mohler & Wood
ATTORNEYS

2,749,715
DRINKING GLASS CHILLER

Reuben S. Tice, Monterey, Calif.

Application June 23, 1955, Serial No. 517,466

9 Claims. (Cl. 62—1)

This invention relates to a device for chilling cocktail glasses and the like, and to an improved method of chilling such glasses.

Heretofore, as shown in United States Letters Patent to Reuben S. Tice, Serial No. 2,587,075, issued February 26, 1952, the cooling of cocktail or other drinking glasses by injecting liquid $CO_2$ into the space enclosed by each such glass has been done successfully.

One of the objects of the present invention is the provision of a device that will automatically cool cocktail glasses without creating a deposit of solid $CO_2$ on the inside walls of such glasses, and which device overcomes any likelihood of the formation of solid $CO_2$ that would interfere with the operation of the device.

Another object of the invention is an improved method of cooling drinking glasses and other hollow objects by the release of liquid $CO_2$ within the space enclosed by the walls of such glasses and objects without the likelihood of freezing the valve in forming solid $CO_2$ on the discharge orifice through which the liquid $CO_2$ is discharged.

In the cooling of glasses and the like by injection of liquid $CO_2$ into the space enclosed by the walls of such glasses, it has heretofore been difficult and in some instances impossible to prevent the formation of solid $CO_2$ in the discharge orifice or in the valve through which the liquid $CO_2$ is discharged. Where a device for cooling the glasses by use of liquid $CO_2$ is used with frequency and by persons unfamiliar with the devices, the latter may be rendered inoperative within a short time.

Also, where solid $CO_2$ is formed in the interiors of glasses and is not permitted to completely sublime before the glasses are filled with beverages, it frequently happens that the beverages will have a slightly cloudy appearance that is harmless and that does not affect the beverage, but which spoils to some extent the appearance thereof.

With the present invention there is an effective and rapid cooling of the glasses or other hollow objects without the formation of solid $CO_2$ on the insides of the glasses, and there is no likelihood of the discharge valve becoming frozen or inoperative or the discharge aperture being wholly or partially closed.

Other objects and advantages will appear in the description and in the drawings.

In detail, the device illustrating the invention shows a pair of supports for cooling a pair of glasses, and from this illustration it will be seen that any desired number of such supports may be provided, so that any desired number of glasses may be cooled.

In order to simplify the description one of the operating assemblies for a single glass and support therefore will be described.

Figure 2:
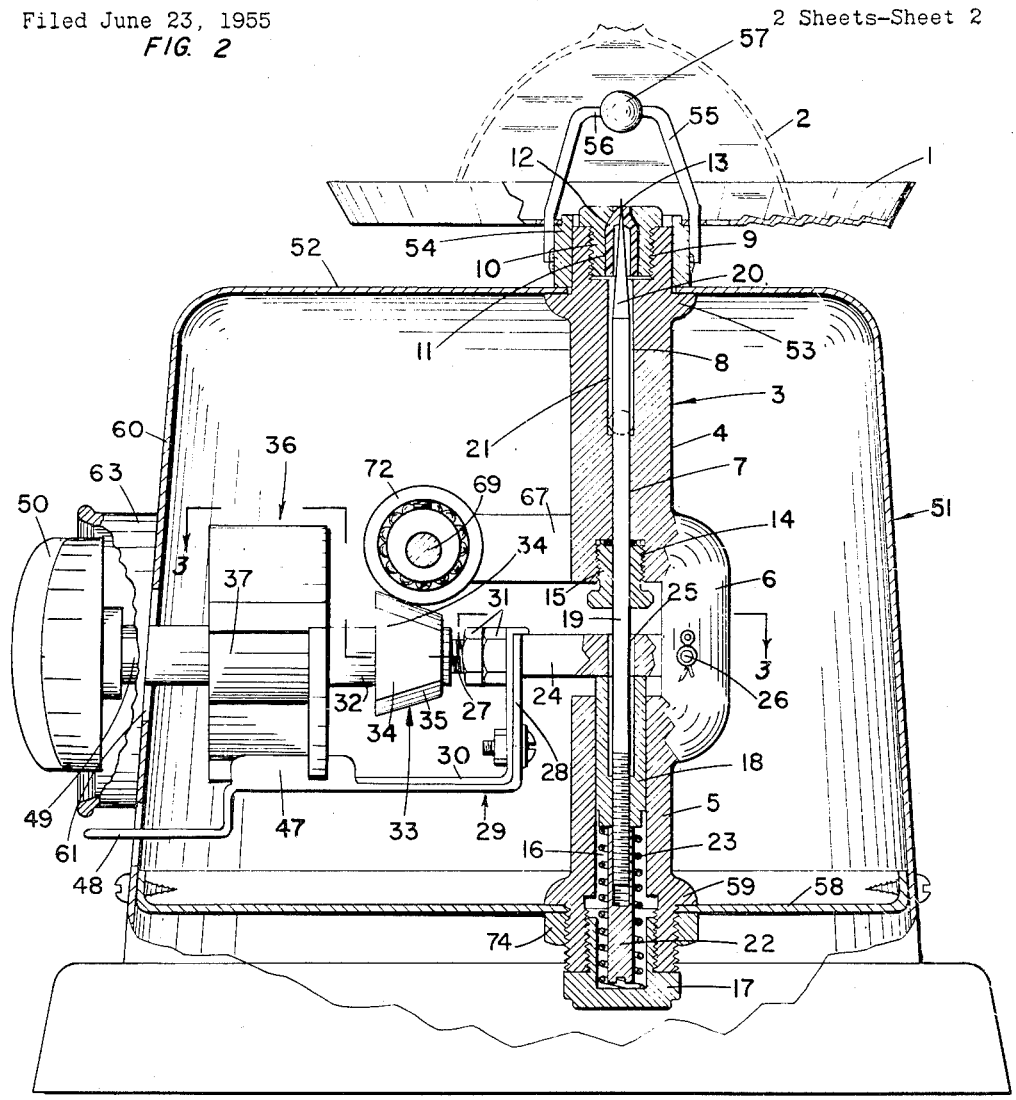
Fig. 2 is a sectional view taken approximately along line 2—2 of Fig. 1.

A horizontally disposed annular platform 1 provides a support for engagement with the edge of an inverted drinking glass. The bowl of a cocktail glass 2 is shown in broken line in Fig. 2 in position on said platform.

The platform 1 is supported on the upper end of a valve assembly generally designated 3.

Each valve assembly 3 comprises an upper vertically elongated member 4 (Fig. 2) and a lower vertically elongated member 5 coaxial with the upper member. These members 4, 5 are held in rigid, vertically spaced, coaxial relationship by a connecting element 6 offset to one side of the common axis of said members.

The upper member 4 is formed with a central passageway 7 coaxial therewith, which passageway is formed with a counterbore 8 at its upper end. This counterbore 8, in turn, is counterbored at its upper end as at 9. The counterbore 9 is internally threaded for an externally threaded valve seat supporting body 10, and body 10, in turn, is formed with a central through bore or passageway 11 coaxial with passageway 7 and with counterbores 8, 9. The sides of the passageway 11 are convergently inclined at its upper end.

A valve seat 12 of plastic material, preferably a polyamide known under the trade name of nylon, and that has the characteristics of being a poor heat conductor and of being elastic under temperatures as low as $-119°$ F., is fitted within the passageway 11 and is provided with a reduced outlet or discharge aperture 13 at its upper end.

At the lower end of passageway 7, the latter is counterbored at 14 and internally threaded for a packing nut 15 and a suitable packing, such as a neoprene O-ring.

The lower member 5 is formed with an enlarged diameter (relative to passageway 7) passageway 16 coaxial with passageway 7, and the lower end of passageway 16 is counterbored and internally threaded for a closure and spring retainer nut 17.

Reciprocally supported by the sides of passageway 16 for vertical reciprocation axially of said passageway is a vertically elongated cylindrical bearing member 18.

This bearing member is formed with a through bore that is internally threaded at its lower end for threadedly engaging the lower end of the stem 19 of a needle valve 20, the latter being on the upper end of said stem. This needle valve has tapered sides that extend at a relatively small angle relative to the axis of the stem 19, and said sides are adapted to seat against the sides of the aperture 13 in seat 12.

The diameter of the stem 19 is preferably uniform and said stem is in slidable engagement with the sides of passageway 7 thus leaving a space 21 between the sides of said stem and the walls of counterbore 8, which spaces may be described as pressure chamber 21.

An elongated nut 22 is secured to the lowermost end of the stem 19 below the bearing member 18 and is slotted at its lower end for rotation by use of a screw driver into locking engagement with the bearing member 18 to enable locking member 18 at any desired point on stem 19. An expansion helical spring 23 reacts between the closed end of nut 17 and the lower end of the bearing member 18.

The upper end of said bearing member 18 projects into the space between the adjacent ends of members 8, 9 and into engagement with the lower side of a lever bar 24.

Lever bar 24 is formed with an opening 25 through which the stem 19 loosely extends, and one end of said bar is connected with the connecting element 6 by a horizontal pivot 26, and the upward expanding tension of spring 23 constantly urges the bar 24 upwardly about the axis of pivot 26.

Lever bar 24 is preferably rectangular in cross-sectional contour in that portion having opening 25 therein, and said bar is formed with an externally threaded axially projecting cylindrical extension 27 that extends through an opening in one arm 28 of a stop spring generally designated 29 and through one arm of a microswitch mounting bracket 30.

A pair of lock nuts 31 tightly secure arm 28 and bracket 30 against the shoulder of bar 24 at the juncture between the rectangular and cylindrical portions.

The threaded extension 27 of bar 24 threadedly extends into a sleeve 32 axially thereof, and which sleeve carries a cone element 33 at one end thereof that is in the form of a cone having two of its opposite sides substantially removed to provide opposite surfaces 34 and two corresponding opposite conical surfaces 35.

This cone sleeve 32 (and the cone element 33) are adjustable as a unit along the threaded extension 27 of bar 24.

This cone sleeve 32 and the cone element 33 thereon are adjustable as a unit along the threaded extension 27 upon rotation of said sleeve relative to said extension.

Secured to the sleeve 32 is a microswitch cam 36. This cam has a hub 37 through which the sleeve 32 extends and a set screw 38 secures said hub to the sleeve 32 in any desired position around and along said sleeve.

Figure 1:
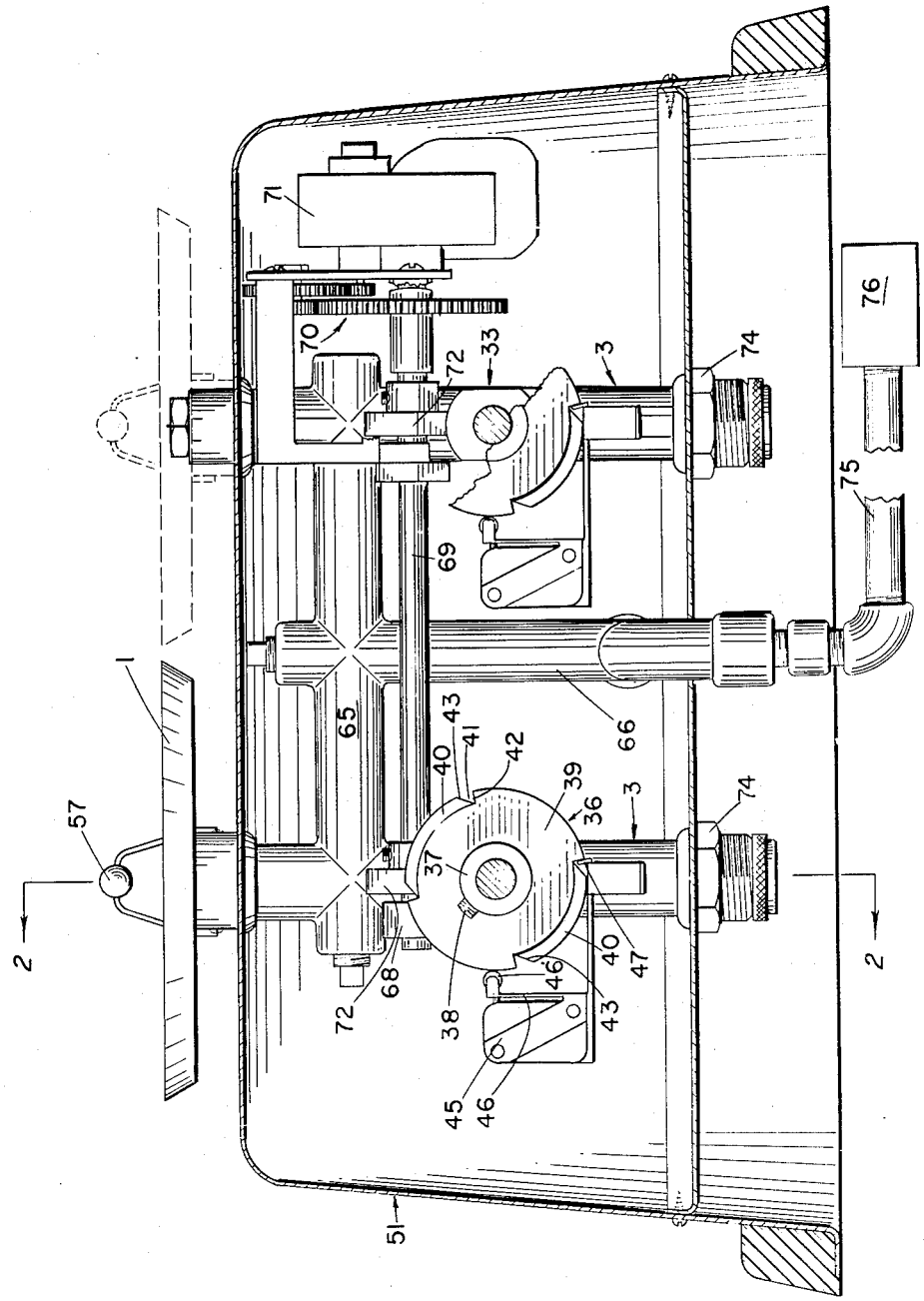
Fig. 1 is a vertical sectional view taken through the housing and certain parts of a two-glass cooler, and in which figure some parts are broken away or are removed to show structure that would otherwise be hidden.

Hub 37 is provided at two opposite sides with radially projecting substantially quarter sectors 39 having circularly extending outer edges concentric with the axis of the hub, and a pair of axially disposed flanges 40 are respectively between the said sectors and concentric with said axis (Fig. 1).

At the juncture between the said flanges and said sectors are notches 41. The side 42 of each notch adjoining the end of the outer edge of each sector extends radially, but the side 43 that adjoins the flanged portion between the adjacent ends of the pair of sectors are slanted.

Figure 3:
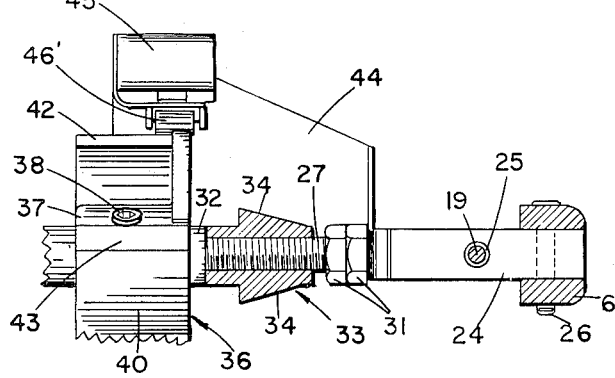
Fig. 3 is a fragmentary, part sectional and part elevational view taken approximately along line 3—3 of Fig. 2.

The microswitch bracket 30 is provided with a lateral extension 44 (Fig. 3) on the outer end of which is secured a microswitch 45 provided with a switch actuating lever 46. This lever 46 has a roller 46' that is adapted to ride on the outer surfaces of the flanges 40 and on the circular outer edges of the sectors 39 when the cam 36 is revolved, and when it is in any notch 41 the switch is open and the current is broken. Rotation of cam 36 in either direction will cause the roller to move out of the notch.

The flanges 40 merely function as stops to prevent the cam 36 from being moved axially a sufficient distance to bring the sectors out from engagement with the roller. One or the other of the flanges will engage the housing before the cam moves axially out of engagement with the roller.

The stop spring 29 is provided with an upturned flange 47 (Figs. 1, 2) that is adapted to spring into one of the notches 41 in cam 36 to prevent accidental rotary movement of the cam in either direction, and it positively prevents rotation in the direction with the radial face 42 of the notch in leading relation while rotation in the other direction is permitted against the frictional resistance of the spring against the slanted side 43.

The said stop spring 29 further includes an extension 48 that is adapted to be manually depressed for moving the flange 47 out of notch 41 so that the cam 36 may be rotated in a direction the reverse of the direction in which it would normally be permitted to rotate.

The sleeve 32 is formed with a solid axially extending extension 49 that has a manually rotatable knob 50 secured thereto for rotating the sleeve 32 and bar 24.

A housing 51 encloses the operating parts of the device except knob 50 and the upper end of the valve assembly 3, including platform 1.

The upper wall 52 of the valve assembly is formed with an opening through which the upper end of the upper member 4 extends, and said member is formed with a shoulder 53 that abuts the under side of the upper wall 52.

A collar 54 is pressed onto the portion of upper member 4 that projects above the upper wall of the housing and through the opening therein, and said collar clamps said wall at the edges of said opening between the shoulder 53 and said collar.

Secured to two opposite sides of said collar are the lower ends of a pair of upwardly convergently extending legs 55, which legs are connected by an upper end piece 56 on which is held a ball 57 with said ball spaced above and directly over the discharge aperture 13 in the plastic valve seat 12. Thus upon ejection of liquid from the said aperture, it will strike the ball 57 and be diffused so as not to be deposited on the inner side of glass 2.

The housing 51 also has a bottom wall 58 that has an opening formed therein coaxially of the upper and lower members 4, 5, and through which the lower end of lower member 5 projects. This lower member is formed with a shoulder 59 that abuts the upper side of the lower wall, and a nut 74 threadedly engages the downwardly projecting end of lower member 5 below the lower wall 58 to clamp said wall between the shoulder 59 and said nut.

The side wall 60 of the housing is formed with a vertically elongated opening 61 through which the extension 49 that is on sleeve 32 and bar 24 extends, this opening being so elongated as to permit the extension 49 and knob 50 to move up and down.

Secured rigid with wall 60 is an annular fitting 63 through which the extension 49 passes to the knob 50.

In the drawings, as has already been explained, a pair of valve assemblies and operating means including knobs 50 and microswitches 45 are provided, and this pair of units are connected by a pipe or conduit 65 (Fig. 1). Preferably the upper and lower members 4, 5, the connecting element 6 for said members, and the pipe 65 are integrally formed, and also an inlet pipe 66 which connects with the pipe 65 midway between upper members 4 is integral with said pipe 65.

Pipe or conduit 65 opens at its ends into the lower ends of the pressure chambers 21 that are formed by the counterbores 8, and the lower end of inlet pipe or conduit 66 is adapted to be connected by pipe 75 with any convenient source 76 of liquid $CO_2$ under pressure.

The lower ends of the upper members 4 have opposed laterally projecting bracket arms 67 rigid therewith, and the outer ends of these arms have bearings 68 thereon for rotatably supporting a horizontal shaft 69, which shaft, in turn, is connected at one end through a chain of gears 70 with an electric motor 71.

Carried on shaft 69 are a pair of eccentric ball bearings 72 respectively disposed over each cone element 33 and in engagement with one of the inclined cone surfaces 35 of each element 33 when each element is turned by rotation of extension 32 so as to bring the inclined sides in a vertical plane. When the cone element is turned so that one of the flat sides 34 faces the eccentric ball bearing 72, the latter will be inoperative for actuating the cone element.

From the foregoing structure it will be seen that by moving cone element 33 axially in one direction or the other, the cone surface 35 will engage eccentric ball bearing at different points nearer or more distant from the axis of the element and the degree of oscillatory movement of the cone element, and consequently bar 24 can be regulated. Upon oscillation of the bar 24 the valve stem 19 will be reciprocated, and hence the valve will be intermittently opened for ejecting liquid $CO_2$ through aperture 13 against ball 57. The rate of said oscillation is important, and it has been found that with a pressure of 900 pounds per square inch on the liquid $CO_2$ the shaft 69 should be rotated at a rate of approximately 93 R. P. M., with the open period of the valve being, of course, for a period of less than half of the period of each revolution.

The above is important in order to insure against the formation of solid $CO_2$ that would render the device inoperative.

The degree of reciprocation of the needle valve 20 is just sufficient to allow the liquid $CO_2$ to expand to a gaseous condition upon release from confinement. A space of approximately .005 to .010 of an inch has been found to be adequate.

The platform 1 is formed with a plurality of equally spaced openings around the central portion and within the confines of the rim of glass 2, which provides an outlet for the gas, although it is desirable that a good seal be provided between the lip or rim of the glass and the platform in order that the cooling of the glass be sufficiently uniform to insure a uniform coating of frost on its outer surface, and which coating results from freezing the atmospheric moisture that condenses on the glass.

The microswitches are connected in an electrical circuit with the motor 71, so that the motor will continue to run if either microswitch is closed. Only when both microswitches are open will the motor stop. The circuit is conventional and is not shown.

When the knob is turned to move open the microswitch the flat side of the cone cam will be under the eccentric bearing and the rotation of the shaft 69 will have no effect on oscillating the lever bar 24. Thus one lever bar may be actuated to actuate the needle valve while the other lever bar will be inoperative.

In operation, assuming the motor is off and the valves are closed, which is a position in which the reduced sides 34 of the cone elements 33 are below the eccentric bearings, the first operation is to place an inverted glass on one of the platforms 1. The knob for the valve assembly of that platform is then rotated to start the motor and to bring a conical surface 35 of the cone element 33 into operative engagement with the eccentric bearing 72. The valve 20 will immediately be reciprocated to cause intermittent discharge of liquid $CO_2$ against the ball 57, which liquid is converted into gas before deposited on the glass and the sub-temperature of approximately 119° F. resulting from the vaporizing of the $CO_2$ will quickly chill the glass and cover it with frost. The knob is then turned to open the switch and to bring the flat reduced side of the cone element below the eccentric bearing. The other platform may have been placed in operation; and, if so, it will continue until the microswitch associated therewith is opened.

It is obvious that one or many more than two of the platforms may be provided, but in any event the ejection of the $CO_2$ is intermittent and the intervals between ejection and the periods for the ejection of the liquid $CO_2$ are predetermined, with the valve opening time or period being such that there will be no formation of solid $CO_2$ to interfere with the operation of the device. Thus the method of cooling a drinking glass as herein disclosed would comprise the step of intermittently ejecting liquid $CO_2$ from a pressure chamber into the space enclosed by the walls of a drinking glass at intervals, and the volume of the liquid $CO_2$ discharged at each ejection and the rate of discharge and period of each discharge being such that the liquid $CO_2$ will be vaporized free from the formation of solid $CO_2$ at the point of ejection.

It is, of course, to be understood that any equivalent of "$CO_2$" might be used in cooling glasses, without departing from the invention.

I claim:

1. A device for chilling drinking glasses comprising: a body enclosing a pressure chamber for liquid $CO_2$ under pressure, a discharge aperture in one of the walls of said chamber, a platform around said aperture having a portion thereof engageable with the rim of a drinking glass, a valve for said aperture movable from a closed to an open position and vice versa, valve actuating means connected with said valve actuable for intermittently moving said valve from said closed to said open position and vice versa and for holding said valve in said open position for uniform periods of time, and means for so actuating said valve actuating means.

2. A device for chilling drinking glasses comprising: a body enclosing a pressure chamber for liquid $CO_2$ under pressure, a discharge aperture in one of the walls of said chamber, a platform around said aperture having a portion thereof engageable with the rim of a drinking glass, a valve for said aperture movable from a closed to an open position and vice versa, valve actuating means connected with said valve actuable for intermittently moving said valve from said closed to said open position and vice versa and for holding said valve in said open position for uniform periods of time, and means for so actuating said valve actuating means, said platform having openings therein between said portion and said aperture for the exhaust of gaseous $CO_2$ from the space adapted to be enclosed by said glass when its rim is on said portion.

3. A device for chilling drinking glasses comprising: a body enclosing a pressure chamber for liquid $CO_2$ under pressure, a discharge aperture in one of the walls of said chamber, a platform around said aperture having a portion thereof engageable with the rim of a drinking glass, a valve for said aperture movable from a closed to an open position and vice versa, valve actuating means connected with said valve actuatable for intermittently moving said valve from said closed to said open position and vice versa and for holding said valve in said open position for uniform periods of time, and means for so actuating said valve actuating means, an elastic valve seat in which said aperture is formed and engageable with said valve, said valve seat being of plastic material that is a relatively poor conductor of heat compared with metal.

4. A device for chilling drinking glasses comprising: a body enclosing a pressure chamber for liquid $CO_2$ under pressure, a discharge aperture in one of the walls of said chamber, a platform around said aperture having a portion thereof engageable with the rim of a drinking glass, a valve for said aperture movable from a closed to an open position and vice versa, valve actuating means connected with said valve actuatable for intermittently moving said valve from said closed to said open position and vice versa and for holding said valve in said open position for uniform periods of time, and means for so actuating said valve actuating means, means for regulating said valve actuating means for varying the degree of movement of said valve by said valve actuating means including a cone member supported for axial movement and a rotatable eccentric element in engagement with said cone member, and means supporting said cone member for movement out of engagement with said element.

5. A device for chilling drinking glasses comprising: a body having a vertically elongated passageway therein, a valve seat in the upper end of said passageway having an upwardly directed discharge aperture therein, said passageway being enlarged below said aperture and seat to provide a pressure chamber for liquid $CO_2$, an inlet opening into said chamber communicating with a source of liquid $CO_2$ under pressure for supplying said liquid $CO_2$ to said chamber, a vertically reciprocable valve member in said passageway movable from a position closing said aperture to an open position opening said aperture to discharge of said liquid $CO_2$ and vice versa, means connected with said valve member for reciprocating the latter between predetermined limits, means for varying the limits of reciprocation of said valve member, a platform around said aperture for supporting an inverted glass over said aperture, and a baffle over said aperture for engagement by liquid CO₂ discharged from said aperture.

6. The method of chilling a drinking glass and the like that comprises the steps of: intermittently and at predetermined uniform intervals of time injecting liquid $CO_2$ into the space enclosed by the walls of said glass and vaporizing the liquid $CO_2$ so injected before it reaches said walls.

7. The method of chilling a drinking glass and the like that comprises the steps of injecting a relatively small amount of liquid $CO_2$ into the space enclosed by the walls of said glass at the rate of between approximately 90 and 100 injections per minute with an interval between each such injection not less than the period of each injection.

8. The method of chilling a drinking glass and the like that comprises the steps of: intermittently and at predetermined uniform intervals of time injecting separate charges of liquid $CO_2$ into the space enclosed by the walls of said glass, impinging said liquid $CO_2$ against an object within said space spaced from said walls for accelerating vaporization of said liquid $CO_2$, and supporting said glass in inverted position during said injection of said $CO_2$ thereinto.

9. The method of chilling a drinking glass and the like that comprises the steps of: intermittently and at predetermined uniform intervals of time injecting separate charges of liquid $CO_2$ into the space enclosed by the walls of said glass, impinging said liquid $CO_2$ against an object within said space spaced from said walls for accelerating vaporization of said liquid $CO_2$, and supporting said glass in inverted position during said injection of said $CO_2$ thereinto, regulating the time interval between each injection of said $CO_2$ to a period that is greater than the period of time for each injection and causing said injections at the rate of between approximately 90 and 100 times per minute.

References Cited in the file of this patent

UNITED STATES PATENTS 2,587,075   Tice _____ Feb. 26, 1952